United States Patent
Glucksman

(10) Patent No.: US 10,485,377 B2
(45) Date of Patent: Nov. 26, 2019

(54) COUNTER TOP COOKING APPLIANCE

(71) Applicant: Dov Z. Glucksman, Winchester, MA (US)

(72) Inventor: Dov Z. Glucksman, Winchester, MA (US)

(*) Notice: Subject to any disclaimer, the term of this patent is extended or adjusted under 35 U.S.C. 154(b) by 809 days.

(21) Appl. No.: 15/078,933

(22) Filed: Mar. 23, 2016

(65) Prior Publication Data

US 2016/0309956 A1    Oct. 27, 2016

Related U.S. Application Data

(60) Provisional application No. 62/136,853, filed on Mar. 23, 2015.

(51) Int. Cl.
| A47J 37/04 | (2006.01) |
| A47J 37/06 | (2006.01) |
| F24C 7/04 | (2006.01) |
| F24C 15/16 | (2006.01) |

(52) U.S. Cl.
CPC ......... *A47J 37/041* (2013.01); *A47J 37/043* (2013.01); *A47J 37/047* (2013.01); *A47J 37/0629* (2013.01); *A47J 37/0641* (2013.01); *A47J 37/0658* (2013.01); *F24C 7/04* (2013.01); *F24C 15/162* (2013.01)

(58) Field of Classification Search
CPC .... A47J 37/042; A47J 37/0623; A47J 37/041; A47J 37/0664; A47J 37/0745; A47J 37/043; A47J 37/0629; A47J 37/0641; A47J 36/06; A47J 37/047; A47J 37/0635; A47J 37/0709; A47J 27/62; A47J 37/049

USPC ......... 99/427, 419, 446, 447, 400, 451, 327, 99/331, 335, 342, 421 R, 421 H, 450, 99/476, 482, 349, 353, 401, 444, 448, 99/479

See application file for complete search history.

(56) References Cited

U.S. PATENT DOCUMENTS

| 2,588,046 | A | * | 3/1952 | Ridgely | ............... A47J 37/041 |
| | | | | | 126/15 A |
| 6,561,083 | B2 | * | 5/2003 | Hsu | ............... A47J 37/041 |
| | | | | | 99/421 H |
| 7,514,651 | B2 | * | 4/2009 | Popeil | ............... A47J 37/042 |
| | | | | | 219/392 |
| 8,017,167 | B2 | * | 9/2011 | Backus | ............... A47J 37/041 |
| | | | | | 426/241 |
| 2014/0216271 | A1 | * | 8/2014 | Arling | ............... A47J 37/041 |
| | | | | | 99/421 H |

* cited by examiner

*Primary Examiner* — Ibrahime A Abraham
*Assistant Examiner* — Chris Q Liu
(74) *Attorney, Agent, or Firm* — Frank Marino

(57) ABSTRACT

A counter top electric appliance optimally performs a variety of cooking modes with both radiant and convective heat sources as well as control means for controlling the timing and intensity of the heat sources. A driver turns food about either a horizontal or a vertical axis of rotation suitable for the specific food and recipe. A hinged door supports the food to be cooked so that in one location the food is caused to be turned by the drive means and in another location the food is loaded into or removed the appliance, external of the cooking compartment, to be easily handled by the operator.

17 Claims, 14 Drawing Sheets

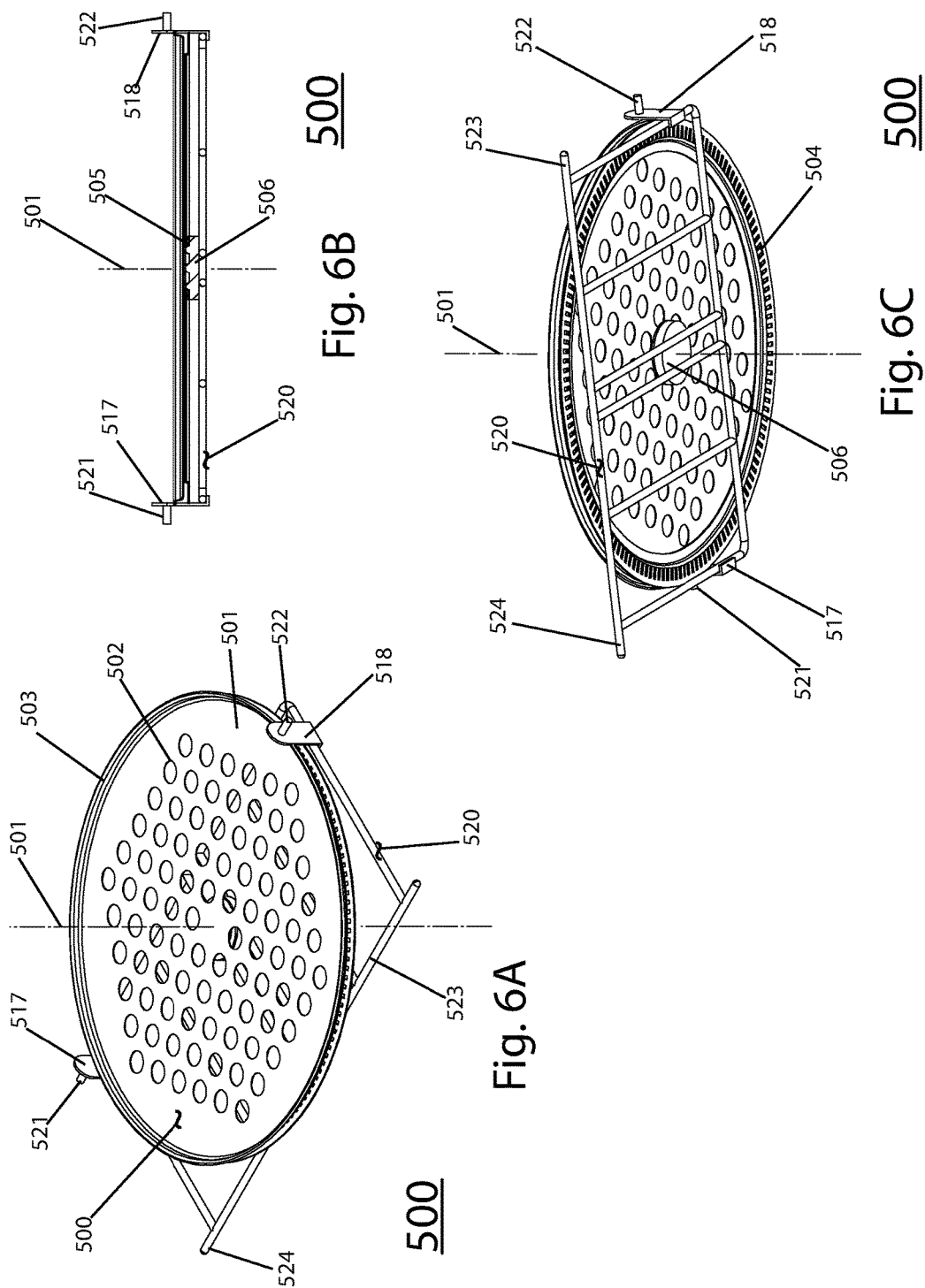

COUNTER TOP COOKING APPLIANCE

RELATED APPLICATION

This application is a non-Provisional Continuation of U.S. Provisional Application No. 62/136,853 filed on 23 Mar. 2015, the teachings of which are incorporated herein in their entirety by reference.

FIELD OF THE INVENTION

This invention generally relates to an electric appliance for cooking and baking food stuff. More specifically this invention relates to a method and apparatus for cooking and baking a variety of food items and following a variety of recipes, by using a combination of radiant heat transfer to the food and convective heat transfer to the food in a sequence and manner that is best suitable for achieving optimal cooking results for each type of food and recipe.

BACKGROUND

Over the past few decades healthy cooking has become more popular as a result of the medical profession having identified the ties between serious ailments such as heart failure, diabetes and even cancer to the food being consumed and to the method of preparing such food. More specifically it was determined that excessive consumption of unsaturated oils and animal fat should be avoided.

To satisfy the need for healthier cooking consumers have been offered recently a variety of electric cooking appliances that satisfy that need, such as: Rotisseries for roasting chicken for example while allowing the fat to drip away from the meet; Air fryers where "French Fries" can be cooked in hot air to achieve similar results to deep frying the fries; Slow Cooker for preparing stews and other dishes without the use of oil and where lean cuts of meat can be cooked to a tender consistency. Each of these products is designed to perform a specific mode of cooking as will be specifically described in the following paragraphs.

Rotisseries, namely appliances where meat, typically chicken, turkey or other fowl are being cooked by rotating the food to be cooked in front of or underneath a radiant source of heat is not new. In fact this type of cooking goes back millennia. More recently a typical rotisserie is disclosed in U.S. Pat. No. 7,325,484 to Backus et al titled: Enclosed Rotisserie with added Convenience. The rotisserie in the '484 patent includes a cooking compartment, drive means for turning the food, hinged door and radiant heaters. While serving well as a product for roasting chicken and other fowl to perfection the product would not be useful otherwise and would have to be put away once the chicken is cooked, as it takes a lot of space on the counter top.

Recently, in an effort to replace deep fried food especially deep fried slice potato wedges (French Fries) with a cooking method where hot air is used to "air fry" such French Fries. US Publication 2008/0163764 discloses such an appliance. While serving well for air frying and other similar dishes the product would not be useful otherwise and would have to be put away once the French Fries are cooked, as it takes a lot of space on the counter top.

There are many other appliances available on the market that are effective in cooking one specific type of food or another, but at the end of the cooking session that product would have to be put away as it takes a lot of space on the counter top. Along with other benefits and features, the appliance according to the present invention is suited to cook and bake a variety of dishes, such as: roasting chicken, grilling a steak, baking cakes, baking pizza, steaming rice, slow cooking a meal, dehydrating fruit and vegetable, and popping corn kernels to prepare Pop-Corn.

SUMMARY OF THE INVENTION

While not limited thereto, the invention may be embodied in a method and/or apparatus for cooking, in a variety of modes, a variety of foods placed in the cooking compartment of a counter top cooking appliance.

The invention may be embodied in or practiced using a counter top cooking appliance having a cooking compartment with at least one source of heat, and a driver for continually rotating at least a portion of a food holder within the cooking compartment about a horizontal axis to uniformly expose food therein to the at least one source of heat. The appliance may have a door integral to the cooking compartment, having closed and open positions and having a food holder support adapted to receive the food holder in a first location outside the cooking compartment when the door is in the open position, shuttle the food holder from the first location to the horizontal axis where the food holder engages the driver when the door is moved to the closed position, and shuttle the food holder back to the first location outside the cooking compartment when the door is moved back to the open position, where the food holder can be removed from the food holder support.

The food holder may be a cylindrical food basket having two horizontal axles extending coaxially, and oppositely outwardly there-from. Each of the two horizontal axles may be releasably supportable by the food holder support, so that the two horizontal axles are coaxial with the horizontal axis when the cylindrical food basket is there-at, and rotation of the food holder within the cooking compartment may be rotation of the cylindrical food basket about the two horizontal axles for uniform exposure of the food therein to the at least one source of heat.

The counter top cooking appliance may further have a drip tray engaging and positioned underneath the cylindrical basket for collecting drippings from the food. The drip tray may be pivotably and removably suspended from the two horizontal axles such that the drip tray remains positioned underneath the cylindrical basket, whether it is in the first location, rotating at the horizontal axis, or anywhere in between. The drip tray may be adapted while engaging the two horizontal axles to support the cylindrical basket when lifted thereby or when rested thereon upon a horizontal surface.

The invention may alternatively be embodied in or practiced using a counter top cooking appliance having a cooking compartment with at least one source of heat, a driver for continually rotating at least a portion of a food holder within the cooking compartment about a vertical axis to uniformly expose food thereon to the at least one source of heat, and a guide. The appliance further having the food holder and a door integral to the cooking compartment, having closed and open positions, and having a food holder support adapted to receive the food holder in a first location outside the cooking compartment when the door is in the open position, shuttle the food holder from the first location to the vertical axis where the food holder engages the driver when the door is moved to the closed position, and shuttle the food holder back to the first location outside the cooking compartment when the door is moved back to the open position where the food holder can be removed from the food holder support. The food holder may be further adapted to engage the guide such that the at least a portion of a food holder maintains a horizontal disposition in the first location, at the vertical axis, and during shuttling there-between. The guide may be a pair of guide channels, each disposed on an opposite sidewall of the cooking compartment, and the food holder may include a planar food tray and a first pair of horizontal pins extending coaxially and oppositely outwardly therefrom. Each of the first pair of horizontal pins may be releasably supportable by the food holder support.

The food holder may also include a second pair of horizontal pins extending oppositely outwardly there-from. Each of the second pair of horizontal pins may releasably engage one of the guide channels when the food holder is at the first location, at the vertical axis, or anywhere there-between. The rotation of the at least a portion of the food holder within the cooking compartment may be rotation of the planar food tray about the vertical axis for uniform exposure of the food thereon to the at least one source of heat.

The invention may alternatively be embodied in or practiced using, in combination, a food tray, a cylindrical food basket, and a counter top cooking appliance. The countertop cooking appliance may have a cooking compartment having at least one source of heat, a driver for alternatively rotating either at least a portion of the food tray within the cooking compartment about a vertical axis or the cylindrical food basket within the cooking compartment about a horizontal axis, for uniformly exposing food therein to the at least one source of heat, and a guide. The appliance may further have a door integral to the cooking compartment, having closed and open positions and having a food holder support adapted to receive the cylindrical food basket in a first basket location outside the cooking compartment when the door is in the open position, shuttle the cylindrical food basket from the first basket location to the horizontal axis where the cylindrical food basket engages the driver when the door is moved to the closed position, and shuttle the cylindrical food basket back to the first basket location outside the cooking compartment when the door is moved back to the open position, where the cylindrical food basket can be removed from the food holder support. The food holder support may be adapted to receive the food tray in a first tray location outside the cooking compartment when the door is in the open position; shuttle the food tray from the first tray location to the vertical axis when the door is moved to the closed position and shuttle the food tray back to the first tray location for removal there-of when the door is moved back to the open position.

The food tray may be further adapted to engage the guide such that the at least a portion of the food tray maintains a horizontal disposition in the first tray location, at the vertical axis, and during shuttling there-between. The guide may be a pair of guide channels, each disposed on an opposite sidewall of the cooking compartment, and wherein the food tray may be a planar food tray having a first pair of horizontal tray pins extending coaxially and oppositely outwardly there-from. Each of the first pair of horizontal tray pins may be releasably supportable by the food holder support. The food tray may also have a second pair of horizontal tray pins extending oppositely outwardly there-from, each of the second pair of horizontal tray pins releasably engaging one of the guide channels when the food tray is at the first tray location, at the vertical axis, or anywhere there-between. The cylindrical food basket may include two horizontal basket axles extending coaxially and oppositely outwardly there-from. Each of the two horizontal basket axles may be releasably supportable by the food holder support, so that the two horizontal basket axles are coaxial with the horizontal axis when the cylindrical food basket is there-at, and rotation of the cylindrical food basket may be rotation about the two horizontal basket axles for uniform exposure of the food therein to the at least one source of heat.

This appliance may also include a drip tray engaging and positioned underneath the cylindrical food basket for collecting drippings from the food. The drip tray may be pivotably and removably suspended from the two horizontal basket axles such that the drip tray remains positioned underneath the cylindrical food basket, whether it is in the first basket location, rotating at the horizontal axis, or anywhere in between. The drip tray may be adapted while engaging the two horizontal basket axles to support the cylindrical food basket when lifted thereby or when rested thereon upon a horizontal surface.

It is an object of this invention to provide a counter top cooking appliance that can optimally perform a variety of cooking modes. It is a further object of this invention to provide a counter top cooking appliance that includes a source of radiant heat as needed in certain cooking modes. It is a further object of this invention to provide a counter top cooking appliance that includes source of convective heat as needed in certain cooking modes. It is a further object of this invention to provide a counter top cooking appliance that includes programmable controller capable of controlling both heating sources in a manner that would be best suitable for certain cooking modes.

It is a further object of this invention to provide a countertop cooking appliance that includes a hinged door for access to the cooking compartment of the appliance. It is a further object of this invention to provide a drive means integral of the cooking appliance for rotating the food stuff to expose the food stuff uniformly to the sources of heat. It is a further object of this invention to provide a cylindrical basket including two axles extending outwardly from the cylindrical basket. Each of the two axles are releaseably supported by two arms integral to the hinged door, so that when the hinged door is closed the cylindrical basket engages the drive means causing the container to rotate about its horizontal axis for exposing different parts of the food stuff to the radiant source of heat. When the hinged door is opened the cylindrical basket is disengaged from the drive means and is removed from the interior of the cooking appliance for ease or removal by the operator.

It is a further object of this invention to provide a drip tray for collecting fat and other drippings from food being cooked inside the rotating cylindrical basket. The drip tray is removable from the two axles of the cylindrical basket and freely swings from the axles; it will therefore remain positioned underneath the rotating cylindrical basket wherever it is.

It is a further object of this invention to provide a horizontal platform to support food stuff being cooked. The horizontal platform is supported on a frame so it is free to spin about its vertical axis. The frame includes two sets of outwardly extending pins. One set of pins is designed to slide in a set of tracks integral to the left and right wall of the cooking compartment. Second set of pins are releaseably supported by two arms integral to the hinged door, so that when the hinged door is closed the horizontal platform engages the drive means causing the platform to rotate about its vertical axis for exposing different parts of the food stuff to the sources of heat. When the hinged door is opened the horizontal platform is disengaged from the drive means and is removed from the interior of the cooking appliance for ease of removal by the operator.

Further features and objects will become apparent upon viewing the following Description and Drawings of an exemplary embodiment

BRIEF DESCRIPTION OF THE DRAWINGS

The various objects, advantages and novel features of this invention will be more fully apparent from a reading of the following detailed description of an exemplary embodiment thereof, in conjunction with the accompanying drawings in which like reference numerals refer to like parts, and in which:

FIGS. 6A, 6B, and 6C are different views of the horizontal platform for supporting food stuff;

DESCRIPTION OF AN EXEMPLARY EMBODIMENT

Figure 1:
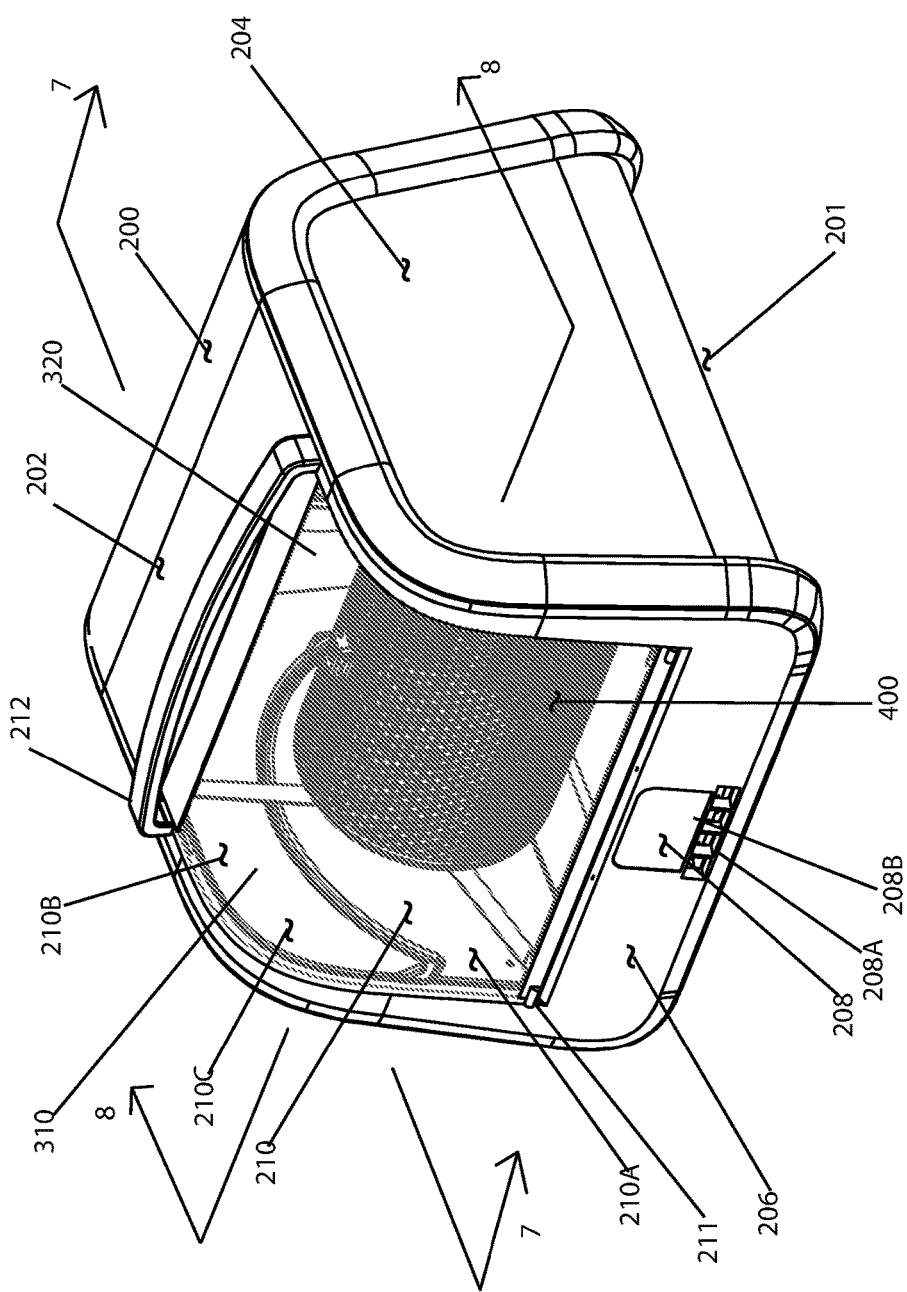
FIG. 1 is an isometric view of a counter top cooking appliance according to the invention, with a cylindrical basket shown through the glass front door.
Figure 2:
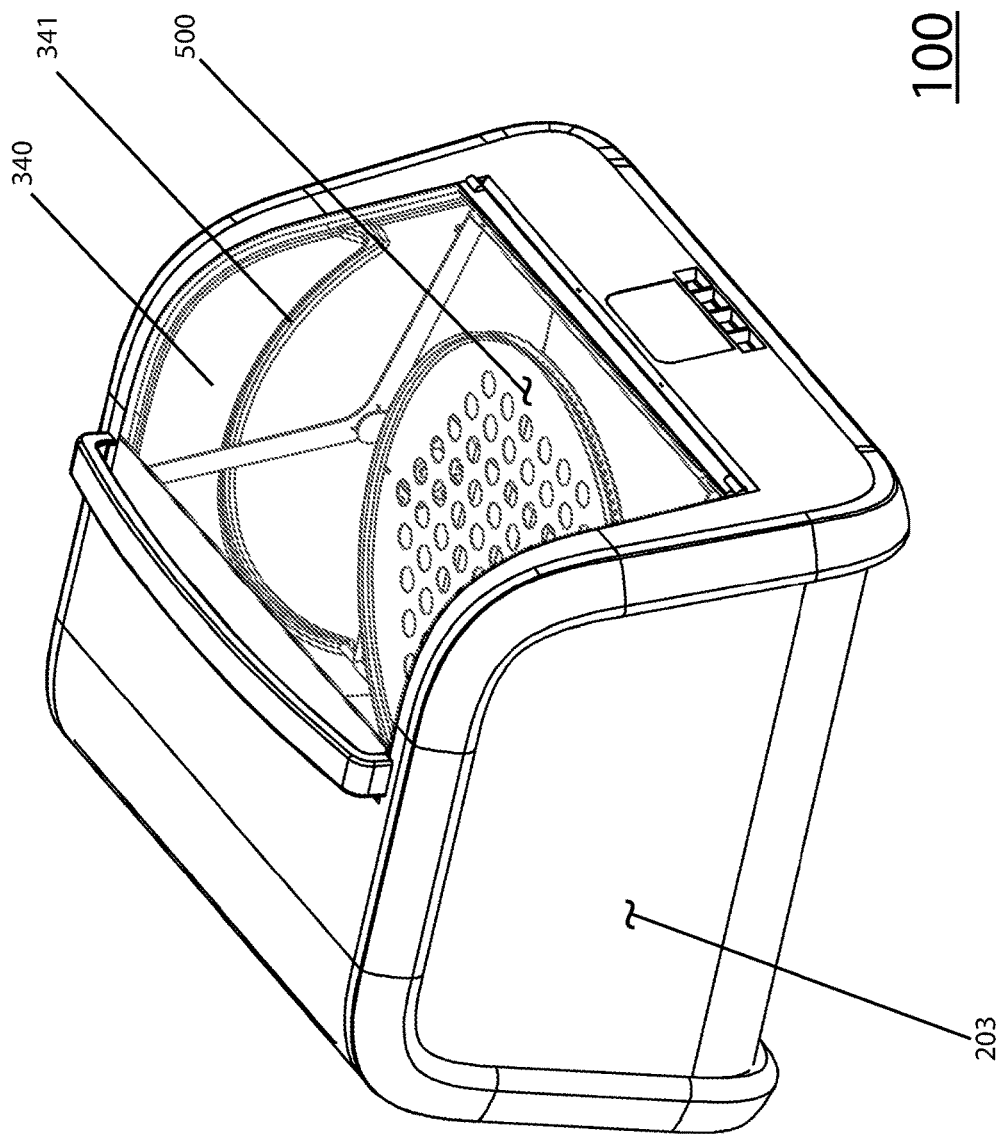
FIG. 2 is another isometric view of a counter top cooking appliance according to the invention, with a horizontal platform for supporting food stuff shown through the glass front door.

An exemplary counter top cooking appliance 100 in accordance with and/or for use in practicing to the invention is shown as isometric views in FIG. 1 and FIG. 2. In particular, an outer enclosure 200 consists of a bottom 201 a top 202 a left side 203 a right side 204, a rear 205 (not shown) and a front 206. Also shown a hinged door 210, preferably partially or fully transparent, with a hinge 211 at its lower end and a handle 212 at its upper end. The hinged door 210 which may be made of glass or high temperature plastics consists of two plane portions 210 A and 210 B and a curved portion 210 C connecting the two. Also shown is a user interface 208 consisting of a series of buttons 208A and a display 208 B.

Also visible through transparent door 210 in FIG. 1 and FIG. 2 are side walls 310, 340 and 320 of the cooking compartment 300 as well as cylindrical basket 400 and horizontal platform for supporting food stuff 500.

Figure 3:
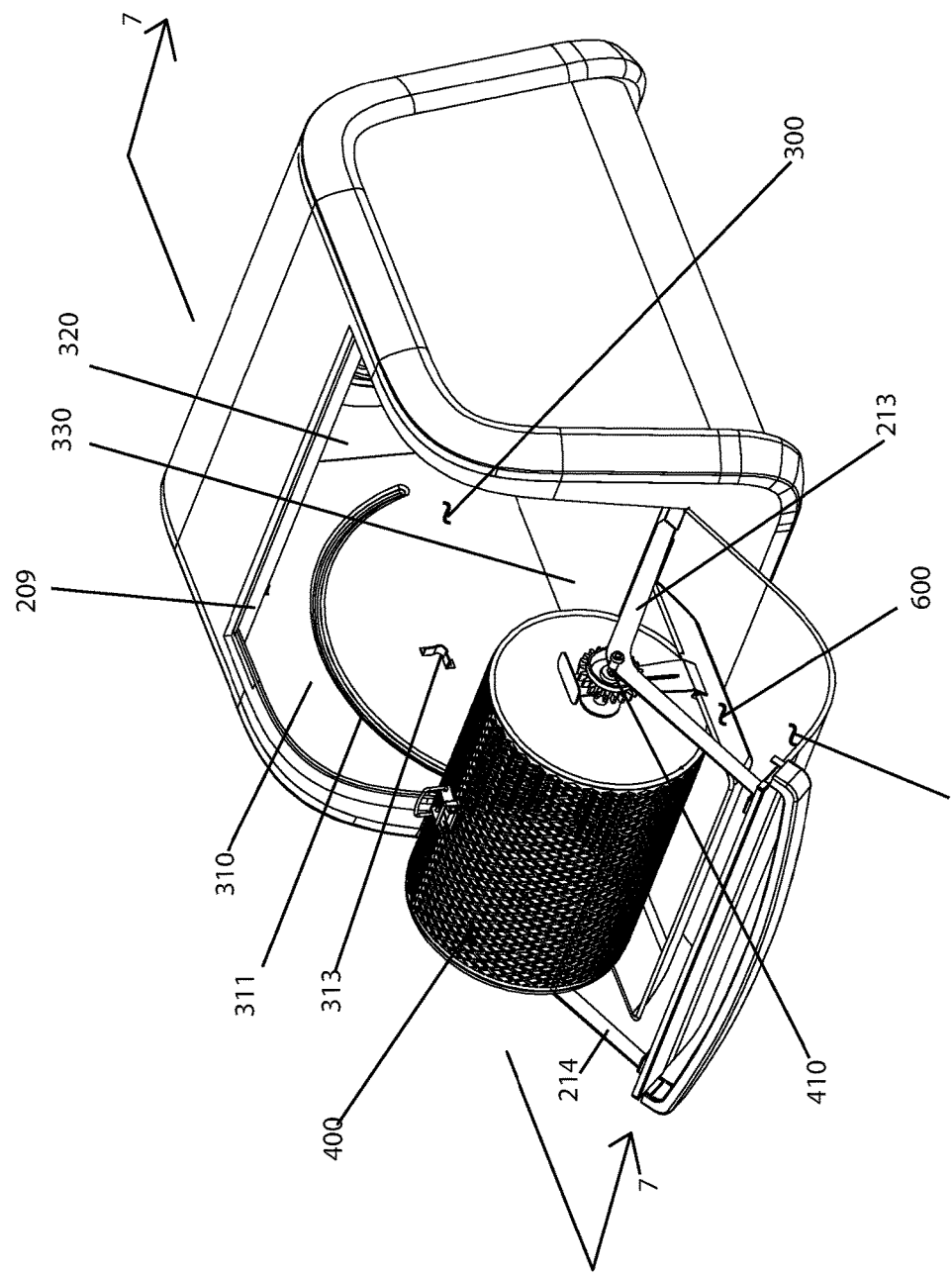
FIG. 3 is an isometric view of a counter top cooking appliance according to the invention, with the front door hinged open and a cylindrical basket shown outside the cooking compartment.

FIG. 3 is an isometric view of the countertop cooking appliance 100 with its door 210 hinged in an open position and a perforated cooking container 400 removably supported by its axels 410 and 411 (not visible) on brackets 213 and 214. Also shown is drip tray 600 suspended from axels 410 and 411. Left side wall 310 shown incorporates and arcuate track 311 and a bracket 313 for supporting axel 410 when door 210 is in its closed position. Also shown is back wall 320 and bottom 330 of cooking compartment 300, as well as horizontal bar 209 serving to support the door 210 when it is hinged to a closed position.

Figure 4:
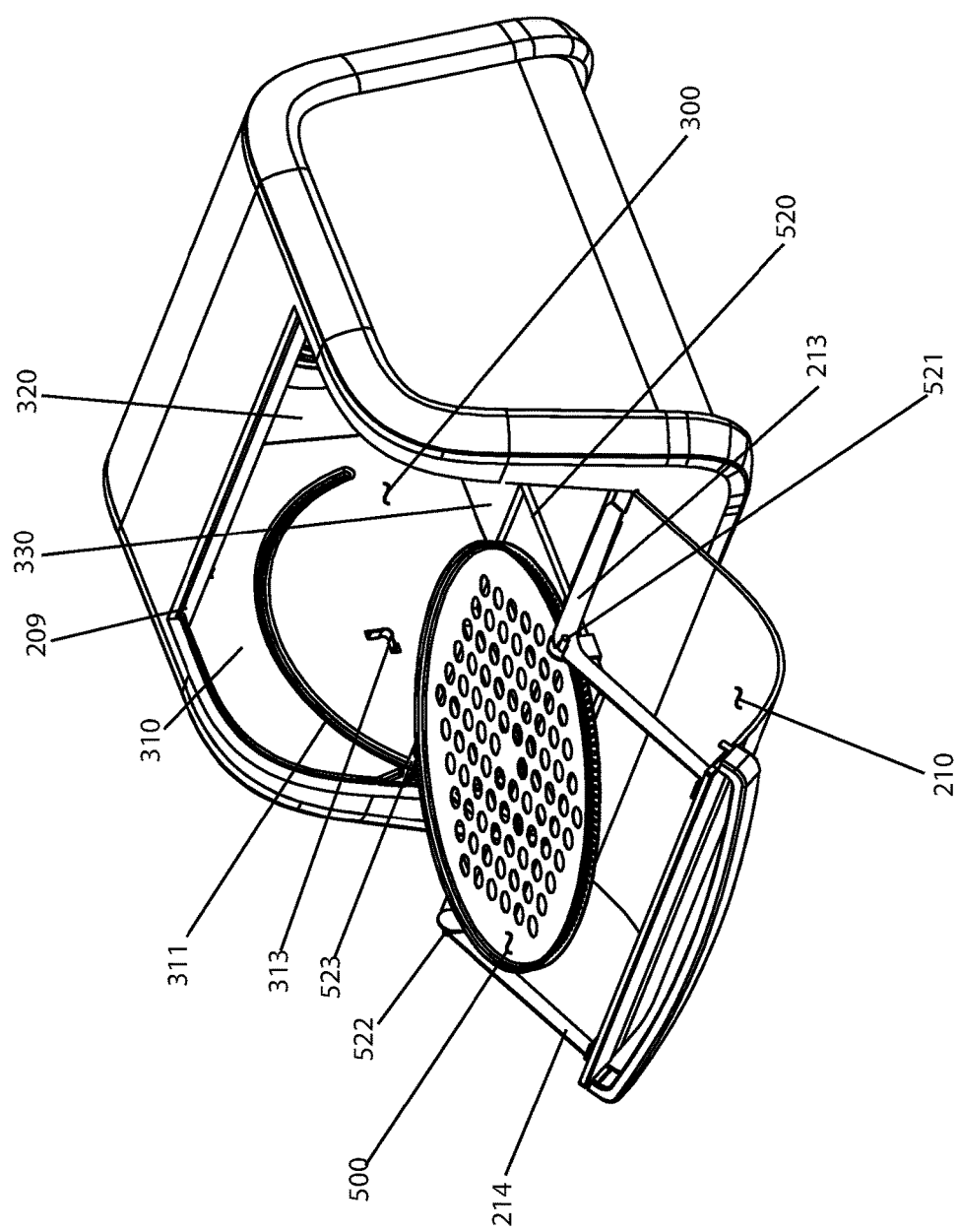
FIG. 4 is an isometric view of a counter top cooking appliance according to the invention, with the front door hinged open and platform for supporting food stuff shown outside the cooking compartment.

FIG. 4 is an isometric view of the countertop cooking appliance 100 with its door 210 hinged in an open position and a horizontal cooking platform 500 for supporting food stuff positioned on a frame 520, which in turn is removably supported by pins 521 and 522 on brackets 213 and 214; also supported by its pins 523 and 524 (not visible) that may slide along tracks 311 in left side wall 310 and 341 (not visible) in right side wall 340 (not visible); also shown is bracket 313 and 314 (not visible) for supporting axels 521 and 522 when door 210 is in its closed position so that the axle is restrained by brackets 313 and 314 and does not apply too great a force on the drive means. Also shown back wall 320 and bottom 330 of cooking compartment 300, as well as horizontal bar 209 serving to support the door 210 when it is hinged to a closed position.

Figure 5B:
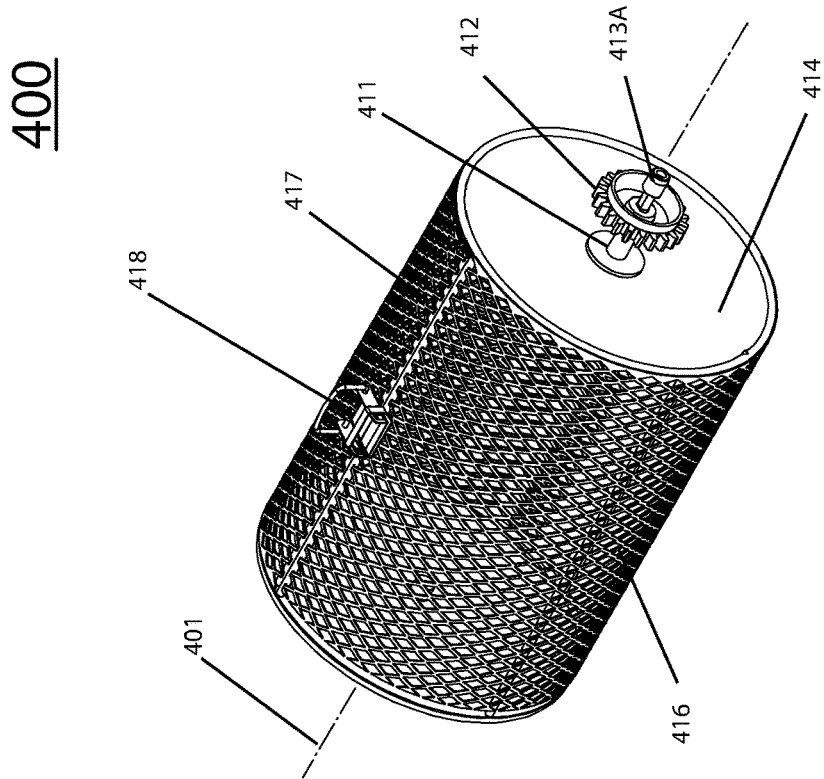
FIGS. 5A and 5B are isometric views of the cylindrical basket.
Figure 5A:
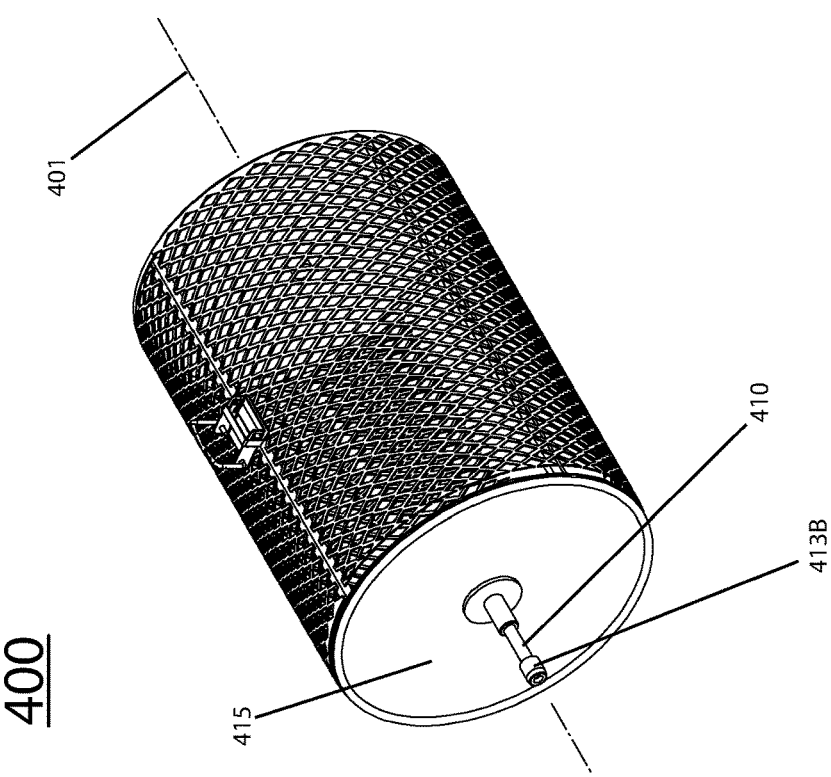

Reference is next made to FIGS. 5 and 5A, which are two isometric views of the rotatable cylindrical basket 400 made to be rotated about its horizontal axis 401 and made for containing food such as a whole chicken or chicken parts to be rotisserie cooked by being exposed to radiant heat, potato wedges to be "air fried" by being exposed to a stream of hot air and radiant heat, sliced vegetables to be "stir frying" in hot air, a steak to be broiled by exposure to radiant heat, corn kernels to be "popped" by contact with hot air, as well as other food stuff that would benefit from being tumbled as it is exposed to either or both radiant and convective heat.

The cylindrical basket 400 has two side walls 414 and 415 and a meshed cylindrical body 417 spanning from one to the other side walls. The side walls are shown as solid circular plates but could also be shaped as a polygon; they could also be perforated in one manner or another. The cylindrical body is made of expanded metal shaped as two half cylinders 416 and 417, hinged together along an axial line, where one half 417 is permanently connected to both side walls whereas the other half 416 can be hinged open to insert or remove food. The two halves are held tightly together by a latch 418, to prevent the basket form opening as it is being rotated during the cooking operation. Two support axles 410, 411 project outwardly from each of the side walls: One of the two axles 411 is provided with a gear 412 designed to mesh with a drive gear 220 for rotating the cylindrical basket 400 about its horizontal axis 401; both the axles are provided with plugs 413 A and B to prevent the axle from accidentally slipping off the support brackets 213 and 214.

FIGS. 6 A, B and C are three views of a platform 500 and its support frame 520 used for supporting variety of food stuff to be cooked, while slowly turning about a vertical axis 501. The platform 500 as shown includes a flat section 501 with multiple apertures 502 (it could also be solid or made from expanded metal or a frame and a screen) is designed to support a pizza pie, exposing it to radiant and convective heat; slices of bread to be toasted; a cake pan; fruit or vegetable slices to be dehydrated by lengthy exposure to tempered temperature air flow.

The platform 500 includes the flat surface 501 with multiple apertures 502 surrounded by a raised rim 503; attached to the underside of the flat surface is a slotted ring 504 designed to mesh with a drive gear 220 for causing the platform to slowly turn about its vertical axis 501. On the lower face of the platform, at its center is an inverted circular cup 505 which fits over a cylindrical projection 506 attached to the center of the support frame 520. The cup 505 and the cylindrical projection 506 serve as a bearing so that the platform 500 can turn freely about vertical axis 501 common the two parts. The cup 505 and the cylindrical projection 506 can be separated for removal of the platform 500 from the frame 520 for cleaning or other purposes. The support frame 520 is made from a series of metal rods bent and welded together in a manner known in the art. The support frame 520 has two sets of outwardly projecting pins, one set 523, 524 at the level of the support frame and other set 521, 522 extends from two small plates 517, 518. The first set of outwardly projecting pins 523, 524 is designed to slide along the arcuate track 311 and 341 in the side walls 310 and 340 of the cooking compartment 300, whereas the second set 521, 522 is designed to be supported on the two hinged door brackets 213, 214. Thus when the door 210 is closed the second set of pins 521, 522 will travel along the door 210 describing an arc centered about the door hinge 211. The arcuate tracks 311 and 341 in the side walls 310 and 340 have the same radius as defined by the travelling pins 523, 524, to ensure that as the platform 500 travels in and out of the cooking compartment 300 it always remains horizontal. FIGS. 9 A, B, C and D illustrate four positions of the platform 500 as the door 210 hinges from closed to open.

Figure 7A:
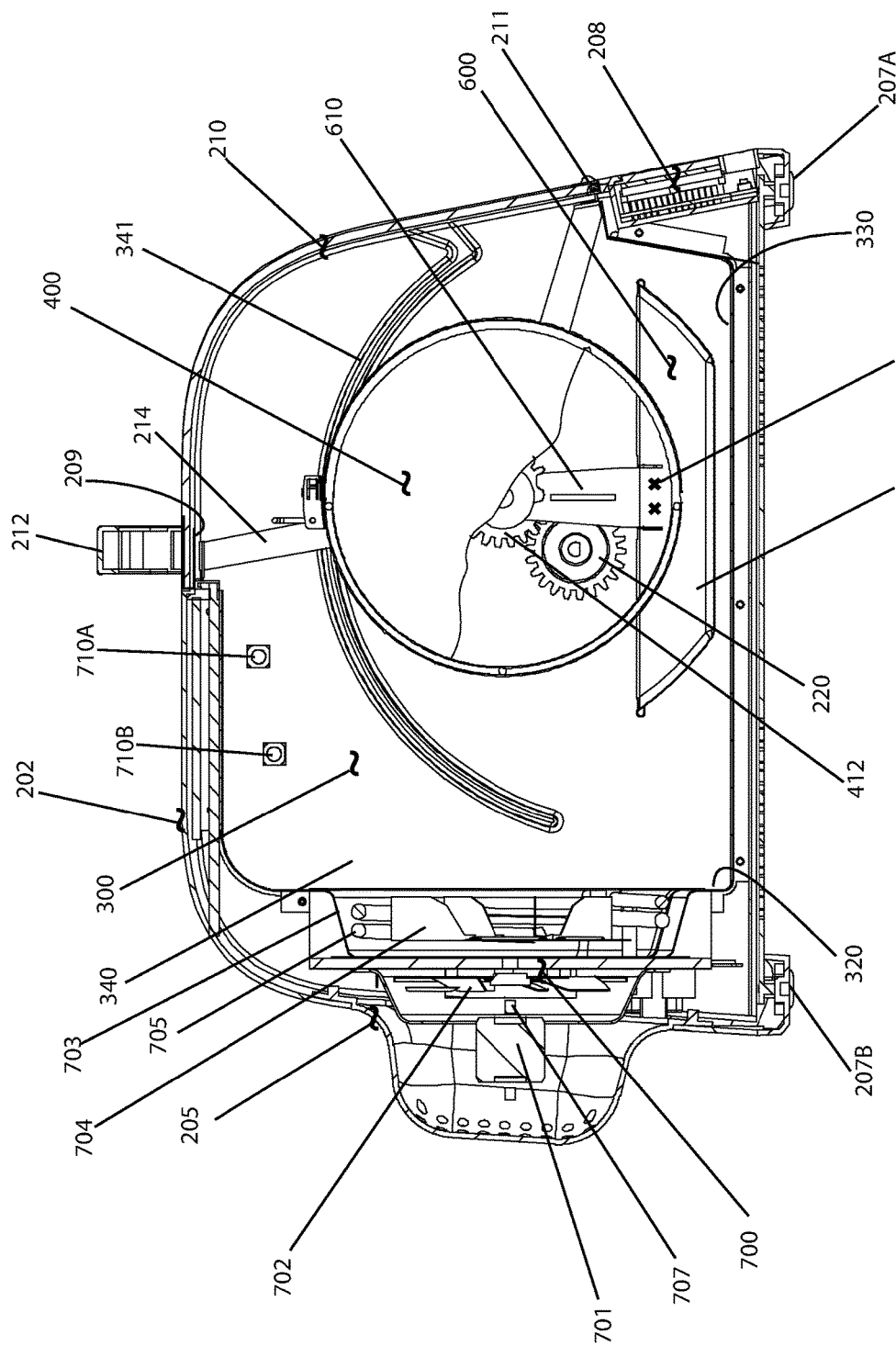
FIG. 7A is a cross sectional view of the counter top cooking appliances taken along the lines 7-7 of FIG. 1.

FIG. 7A is a cross sectional views of the counter top cooking appliance 100 with the hinged door 210 closed and the cylindrical basket 400 in position where its gear 412 engages the drive gear 220 of the appliance. The cylindrical basket 400 is shown with a portion removed to illustrate how the two gears 412, 220 are meshed together. Also shown is the drip tray 600 with one of its support arms 610 suspending the drip tray pan 630 from the axle of the cylindrical basket 411 (not shown). FIG. 7A also shows the arcuate track 341 which is only used in conjunction with the platform 500, as described in [28] and [30]. Also shown two radiant heating rods 710 A and B as well as the convective heating assembly 700 with a motor 701, a motor cooling fan 702, a cowl 703 communicating with the cooking compartment 300 and containing a convection fan 704 mounted on and driven by the motor shaft 707 of motor 701 and a heating element 705 surrounding the convection fan 704 for heating air exiting from the convection fan 704 blades. Also shown is the hinged door 210 with its support bracket 214, electronic controls 208 on the front lower portion of the appliance. As well as the bottom wall 330 rear wall 320 and top wall 350 of the cooking compartment 300, and the outer wall 240 of the appliance spaced apart from the walls of the cooking compartment 300 to maintain the outer enclosure 200 cool to the touch. Also shown are two of the four support feet 207 to keep the appliance off the kitchen counter.

Figure 7B:
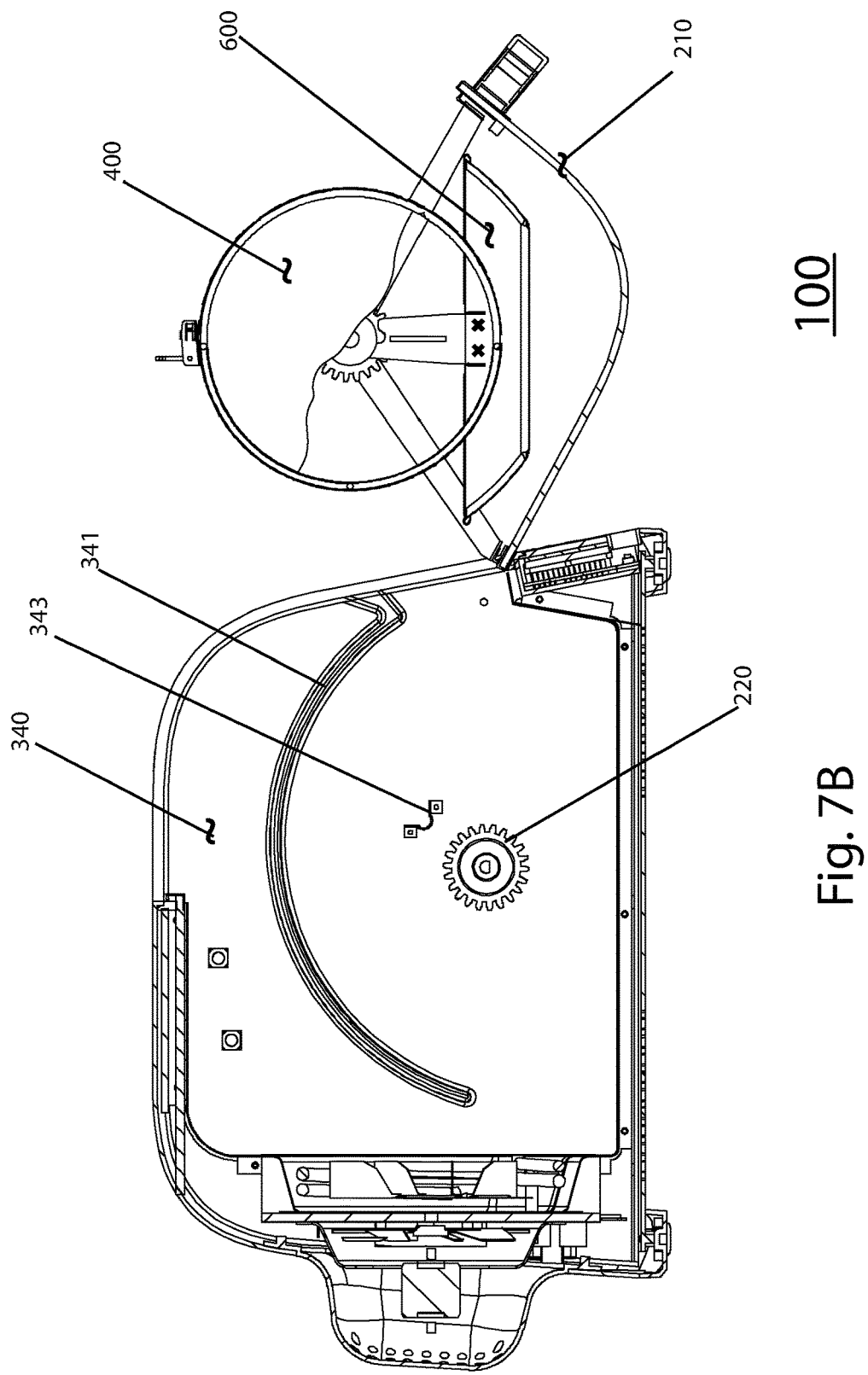
FIG. 7B is a cross sectional view of the counter top cooking appliances taken along the lines 7-7 of FIG. 3

FIG. 7 B shows the same cross section as FIG. 7 A, except that the hinged door 210 is shown in its open position with the cylindrical basket 400 completely outside the oven for easy removal by the user. The drip tray 600 is shown positioned underneath the cylindrical basket 400 so that any drippings would be contained and not mar the glass door. Also shown on the side wall 340 a retraining bracket 343 meant to support the axle 410 of the cylindrical basket 400 so as not to apply too much weight to the gear motor 230.

Figure 8:
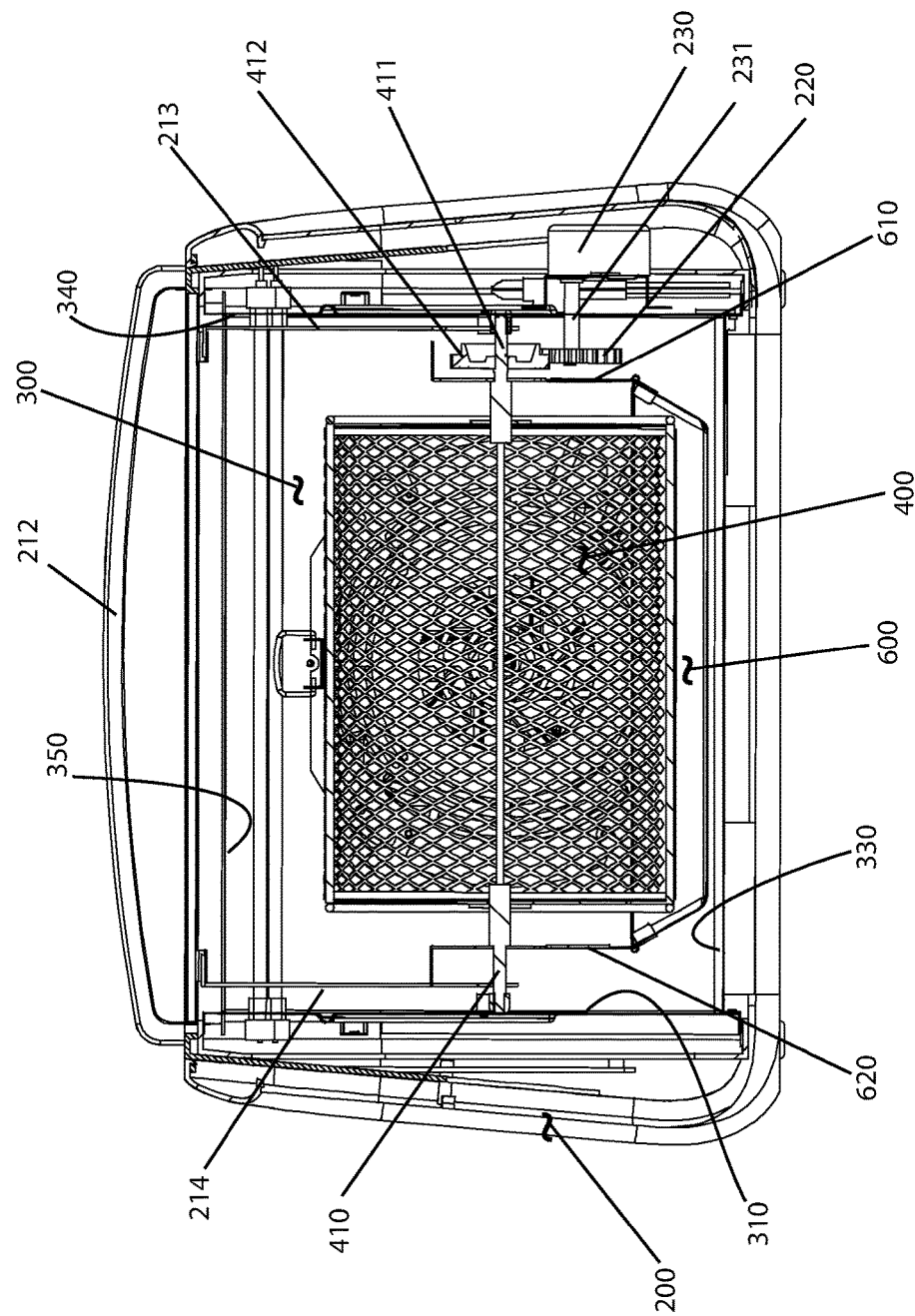
FIG. 8 is a cross sectional view of the counter top cooking appliances taken along the lines 8-8 of FIG. 1.
Figure 9A:
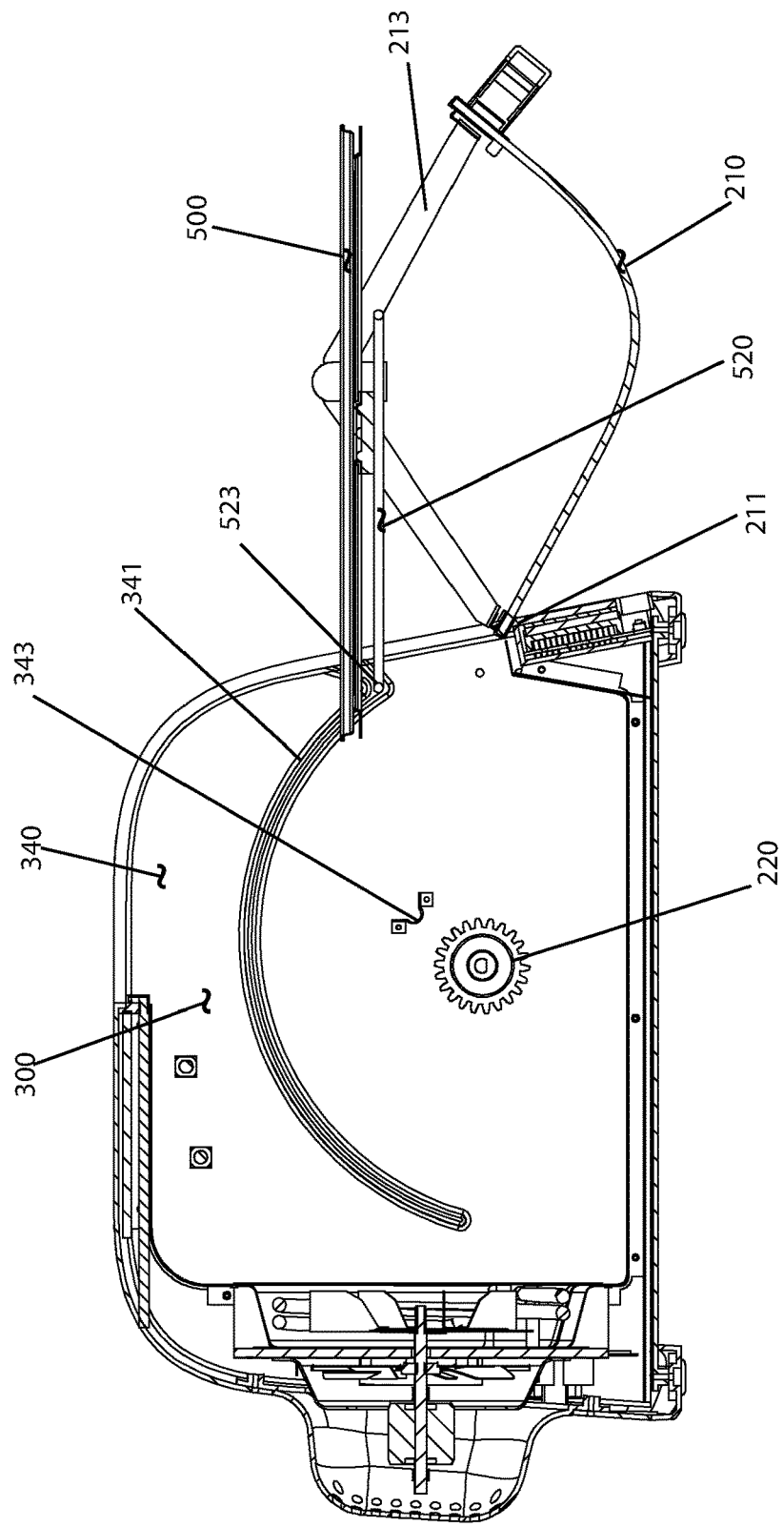
FIGS. 9A, 9B, 9C, and 9D are cross sectional views of the is a cross sectional view of the counter top cooking appliances showing the hinged door and the platform for supporting food stuff in four different positions.
Figure 9B:
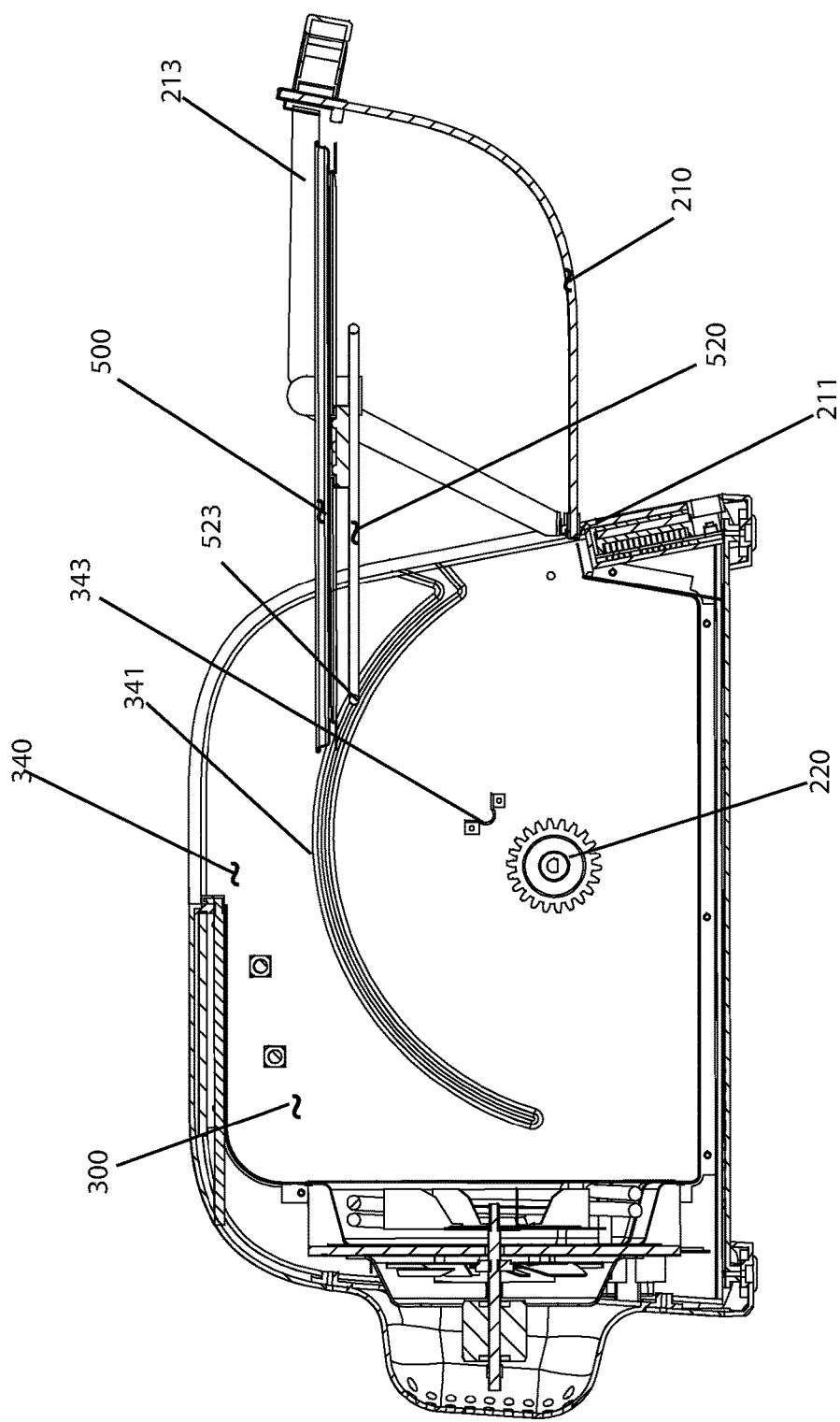
Figure 9C:
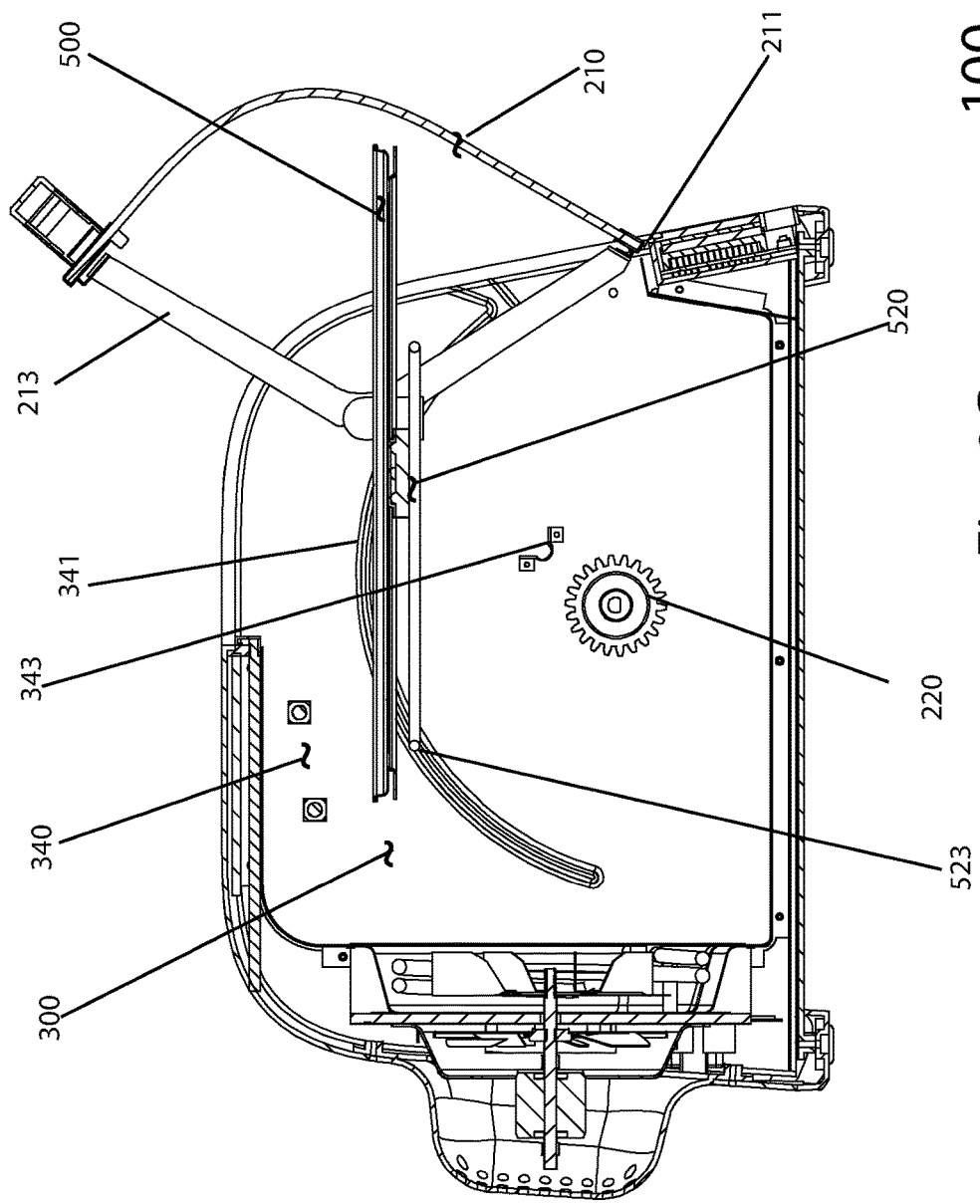
Figure 9D:
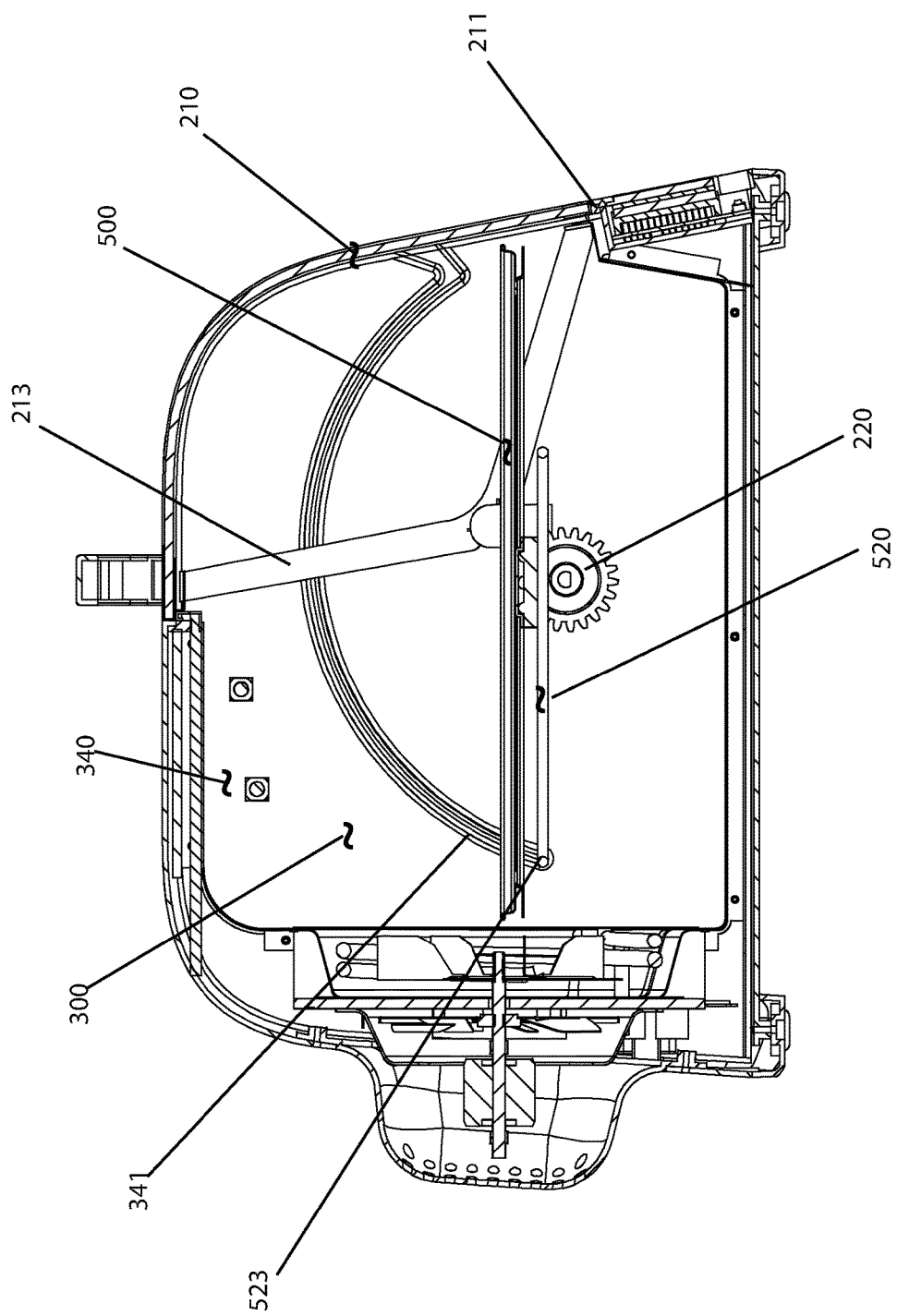

FIG. 8 is a frontal cross sectional view of the counter top cooking appliance 100 showing the cylindrical basket axles 410, 411 supported on the door brackets 213, 214, with the drip tray 600 suspended from the axles 410, 411 by its two side brackets 610 and 620. Also shown is the gear motor 230 located in the space between the outer enclosure 200 and the cooking compartment 300 with its shaft 231 penetrating through side wall 340, the shaft 231 terminating in a gear 220 shown in engagement with the axle gear 412 of the cylindrical basket 400. Also shown are the hinged door handle 212, the top 350 and bottom 330 as well as side walls 310, 340 of the cooking compartment 300 and the outer enclosure 200 of the appliance.

FIGS. 9 A,B,C and D are cross sectional views through the counter top cooking appliances 100; they are provided to illustrate the movement of the platform 500 as the door 210 is gradually closes. In FIG. 9A the platform 500 and its support frame 520 are shown with their two sets of pins 521 and 523 (hidden) respectively placed in the track 341 of the side wall 340 of the cooking compartment 300 and on the hinged door bracket 213. FIGS. 9 B and C show the platform 500 with the door 210 progressively closing, and with the platform 500 remaining in a horizontal position, due to the shape of the track 341, having the same radius as defined by the hinge 211 and the location of the front set of pins 521, 522. FIG. 9 D shows the hinged door 210 fully closed and the platform slotted ring 504 (not shown) engaging the drive gear 220 of the appliance 100.

Figure 10:
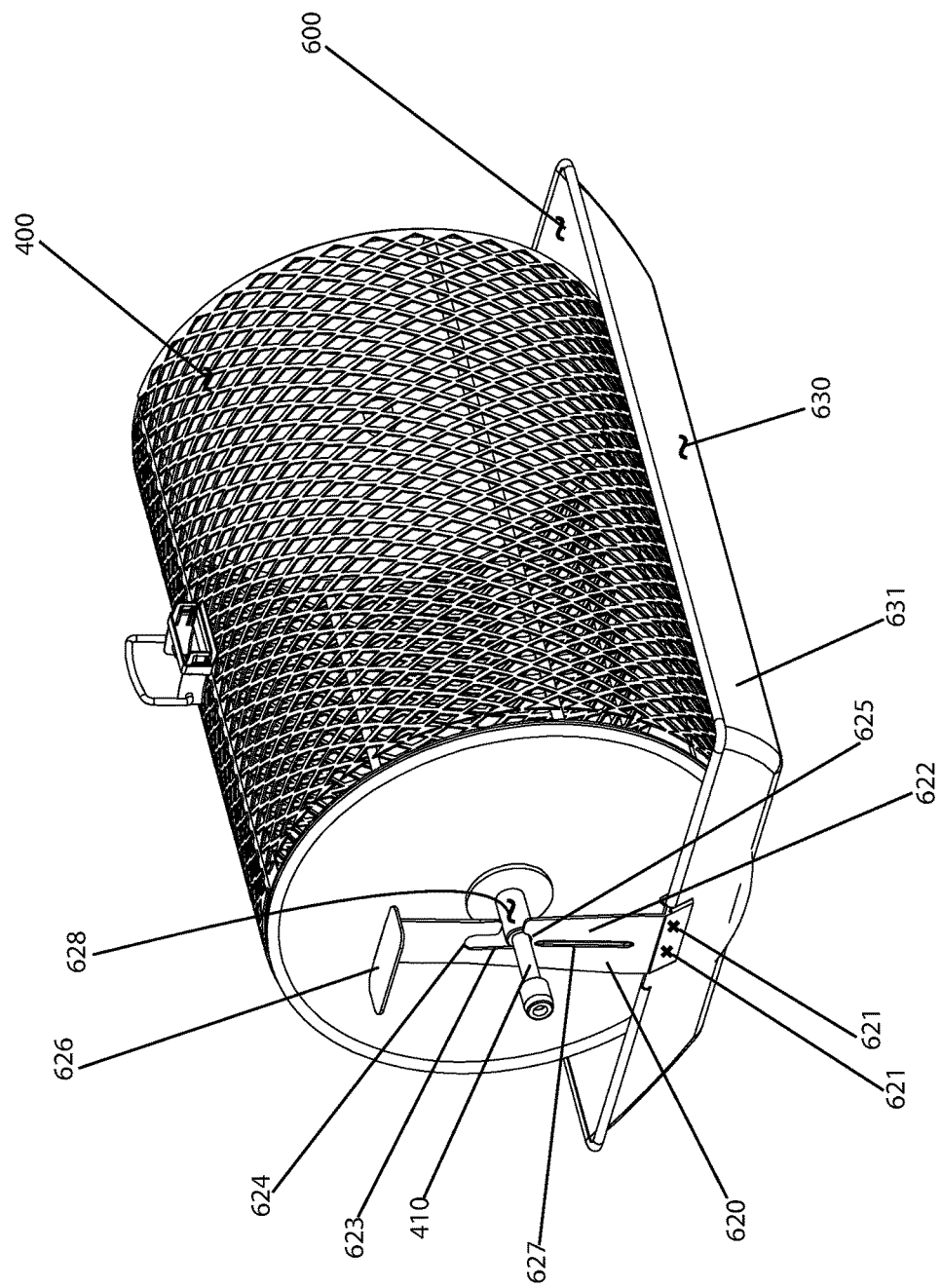
FIG. 10 is an isometric view of the cylindrical basket and the drip tray resting on a countertop after having been removed from the support structure integral to the hinged door of the appliance.

FIG. 10 is an isometric view of the drip pan 600 removed from the cooking appliance 100 and supporting the cylindrical basket 400. The drip pan 600 has a pan portion 630 with contiguous side wall 631 for containing a predetermined volume of drippings and fat being removed from chicken or other fowl during the roasting process. The pan has two support arms 610 (not visible) and 620 connected to the pan by spot welds 611 (not visible) and 621. Support arm 620 includes a vertical portion 622 with a stiffening rib 627. The vertical portion 622 features an elongated slot 623 with an upper end 624 and lower end 625 and with a side opening 628 through which the axle 410 of the cylindrical basket 400 can be slid in and out of engagement with the drip pan 600. When the drip pan 600 is suspended from the cylindrical basket 400 the axel 410 engages the upper end 624 of the slot 623. When the drip pan 600 is placed on a counter top, for placing or removing food from the basket 400 the axel 410 rests on the lower end 625 of the slot 623.

While inventive aspects of the invention will be appreciated from the detailed description and drawings. It should be understood that although the invention have been demonstrated by reference to an exemplary embodiment including alternative variations thereto, aspects of the invention are not limited to the embodiment(s) described. Also, aspects of the invention may be used alone, or in any suitable combination with other aspects of the invention. Therefore, the invention should only be limited according to the following claims, including all equivalent interpretation entitled thereto.

I claim:

1. A counter top cooking appliance comprising:
a cooking compartment having at least one source of heat from the group comprising radiant heating rods, a convective heating assembly and a heating element, a driver adapted for rotating, one at a time, at least a portion of a first food holder and a second food holder within the cooking compartment: the first food holder associated with and rotatable about a horizontal axis to uniformly expose food therein to the at least one source of heat, and the second food holder associated with and rotatable about a vertical axis to uniformly expose food thereon to the at least one source of heat;
a door integral to the cooking compartment, having closed and open positions and comprising a food holder support adapted to:
receive a selected one of the first and second food holders in a first location outside the cooking compartment when the door is in the open position;
shuttle the selected one from the first location to the horizontal axis where the selected one engages the driver when the door is moved to the closed position; and
shuttle the selected one back to the first location outside the cooking compartment when the door is moved back to the open position, where the selected one can be removed from the food holder support
wherein the food holder support comprising a pair of brackets; the first food holder comprises two horizontal axles extending coaxially with the horizontal axis and oppositely outwardly there-from, the second food holder comprises a first pair of horizontal pins and a second pair of horizontal pins; and the brackets configured to support the two horizontal axles of the first food holder and the first pair of pins of the second food holder.

2. The counter top cooking appliance of claim 1 wherein the first food holder is a cylindrical food basket and rotation of the first food holder within the cooking compartment comprises rotation of the cylindrical food basket about the horizontal axis for uniform exposure of the food therein to the at least one source of heat.

3. The counter top cooking appliance of claim 2 further comprising a drip tray engaging and positioned underneath the cylindrical basket for collecting drippings from the food; the drip tray pivotably and removably suspended from the horizontal axis such that the drip tray remains positioned underneath the cylindrical basket, whether it is in the first location, rotating at the horizontal axis, or anywhere in between.

4. The counter top cooking appliance of claim 3 where the drip tray is adapted while engaging the horizontal axis to support the cylindrical basket when lifted thereby or when rested thereon upon a horizontal surface.

5. The counter top cooking appliance of claim 4 wherein each of the two horizontal axles releasably supportable by the food holder support, so that the two horizontal axles are coaxial with the horizontal axis when the cylindrical food basket is there-at, and rotation of the first food holder within the cooking compartment comprises rotation of the cylindrical food basket about the two horizontal axles.

6. The counter top cooking appliance of claim 5 wherein the drip tray is pivotably and removably suspended from the two horizontal axles such that the drip tray remains positioned underneath the cylindrical basket, whether it is in the first location, rotating at the horizontal axis, or anywhere in between.

7. The counter top cooking appliance of claim 6 wherein the drip tray is adapted while engaging the two horizontal axles to support the cylindrical basket when lifted thereby or when rested thereon upon a horizontal surface.

8. The counter top cooking appliance of claim 1 wherein the second food holder is a planar food tray and rotation of the second food holder within the cooking compartment comprises rotation of the planar food tray about the vertical axis for uniform exposure of the food therein to the at least one source of heat.

9. The counter top cooking appliance of claim 8 further comprising a guide; wherein the second food holder is further adapted to engage the guide such that the at least a portion of a planar food tray maintains a horizontal disposition in the first location, at the vertical axis, and during shuttling there-between.

10. The counter top cooking appliance of claim 9 wherein the guide comprises a pair of guide channels, each disposed on an opposite sidewall of the cooking compartment, and wherein the first pair of horizontal pins extending coaxially and oppositely outwardly there-from each of the first pair of horizontal pins releasably supportable by the food holder support, and the second pair of horizontal pins extending oppositely outwardly there-from each of the second pair of horizontal pins releasably engaging one of the guide channels when the second food holder is at the first location, at the vertical axis, or anywhere there-between.

11. The counter top cooking appliance of claim 1 wherein the first food holder is a cylindrical food basket and the second food holder is a planar food tray; and rotation of the first food holder within the cooking compartment comprises rotation of the cylindrical food basket about the horizontal axis for uniform exposure of the food therein to the at least one source of heat; and wherein and rotation of the second food holder within the cooking compartment comprises rotation of the planar food tray about the vertical axis for uniform exposure of the food therein to the at least one source of heat.

12. The counter top cooking appliance of claim 11 further comprising a drip tray engaging and positioned underneath the cylindrical basket for collecting drippings from the food; the drip tray pivotably and removably suspended from the horizontal axis such that the drip tray remains positioned underneath the cylindrical basket, whether it is in the first location, rotating at the horizontal axis, or anywhere in between.

13. The counter top cooking appliance of claim 12 where the drip tray is adapted while engaging the horizontal axis to support the cylindrical basket when lifted thereby or when rested thereon upon a horizontal surface.

14. The counter top cooking appliance of claim 13 wherein each of the two horizontal axles releasably supportable by the food holder support, so that the two horizontal axles are coaxial with the horizontal axis when the cylindrical food basket is there-at, and rotation of the first food holder within the cooking compartment comprises rotation of the cylindrical food basket about the two horizontal axles.

15. The counter top cooking appliance of claim 14 wherein the drip tray is pivotably and removably suspended from the two horizontal axles such that the drip tray remains positioned underneath the cylindrical basket, whether it is in the first location, rotating at the horizontal axis, or anywhere in between.

16. The counter top cooking appliance of claim 15 further comprising a guide; wherein the second food holder is further adapted to engage the guide such that the at least a portion of a planar food tray maintains a horizontal disposition in the first location, at the vertical axis, and during shuttling there-between.

17. The counter top cooking appliance of claim 16 wherein the guide comprises a pair of guide channels, each disposed on an opposite sidewall of the cooking compartment, and wherein the second food holder further comprises a first pair of horizontal pins extending coaxially and oppositely outwardly there-from; each of the first pair of horizontal pins releasably supportable by the food holder support, and second pair of horizontal pins extending oppositely outwardly there-from; each of the second pair of horizontal pins releasably engaging one of the guide channels when the food holder is at the first location, at the vertical axis, or anywhere there-between.

\* \* \* \* \*